United States Patent

Schebesta et al.

[11] Patent Number: 5,876,115
[45] Date of Patent: Mar. 2, 1999

[54] SELF-CLEANING REACTOR/MIXER FOR HIGHLY VISCOUS AND COHESIVE MIXING MATERIALS

[75] Inventors: Klaus Schebesta; Heinrich Schuchardt; Martin Ullrich, all of Leverkusen, Germany

[73] Assignee: Bayer Aktiengesellschaft, Germany

[21] Appl. No.: 822,242

[22] Filed: Mar. 20, 1997

[30] Foreign Application Priority Data

Mar. 26, 1996 [DE] Germany .................. 196 11 852.2

[51] Int. Cl.⁶ ............... B29B 7/48; B29B 7/20; B01F 7/04
[52] U.S. Cl. .................. 366/97; 366/300; 366/318; 366/301
[58] Field of Search .................. 366/97, 96, 81, 366/82, 83, 84, 85, 297, 298, 299, 300, 301, 309, 311, 312; 425/204, 208, 209

[56] References Cited

U.S. PATENT DOCUMENTS

| | | |
|---|---|---|
| 3,195,868 | 7/1965 | Loomans et al. .................. 366/301 |
| 4,650,338 | 3/1987 | List et al. .................. 366/97 |
| 4,752,135 | 6/1988 | Loomans .................. 366/97 |
| 4,950,081 | 8/1990 | List .................. 366/301 |
| 5,334,358 | 8/1994 | Schuchardt et al. .................. 366/297 |
| 5,399,012 | 3/1995 | Schuchardt et al. .................. 366/97 |
| 5,407,266 | 4/1995 | Dotsch et al. .................. 366/97 |
| 5,505,536 | 4/1996 | Schuchardt .................. 366/97 |
| 5,658,075 | 8/1997 | Schebesta et al. .................. 366/97 |
| 5,669,710 | 9/1997 | Schebesta et al. .................. 366/97 |

FOREIGN PATENT DOCUMENTS 1197720 12/1959 France .

Primary Examiner—Tony G. Soohoo
Attorney, Agent, or Firm—Connolly & Hutz

[57] ABSTRACT

The invention relates to a fully self-cleaning reactor/mixer having a large freely usable volume, that cleans itself kinematically, consisting of two or more parallel shafts (2, 2') rotating in opposite directions, on which are located spirally arranged, axially offset paddles (3, 3') with scrapers (4, 4', 5, 5') on the front and rear of the paddles, and a surrounding housing (1). Since all the scrapers (4, 4') on the upstream side of the paddles (3, 3') convey the material concerned outwards and all the scrapers (5, 5') on the downstream side of the paddles convey the material inwards, axial conveyance is obtained.

8 Claims, 14 Drawing Sheets

SELF-CLEANING REACTOR/MIXER FOR HIGHLY VISCOUS AND COHESIVE MIXING MATERIALS

The invention relates to a fully self-cleaning reactor/mixer having a large, freely usable volume, that cleans itself kinematically, consisting of two or more parallel shafts rotating in opposite directions on which are located spirally arranged, axially offset paddles with scrapers on the front and rear of the paddles, and a surrounding housing. Since all the scrapers on the upstream side of the paddles convey the material concerned outwards and the scrapers on the downstream side of the paddles convey the material inwards, axial conveyance is obtained.

The mixer is used for the industrial treatment of fluids and cohesive bulk materials. The mixer cleans itself fully kinematically and has a large free usable volume.

In the production and processing of for example plastics and rubber highly viscous fluids have to undergo industrial treatment. In particular, apparatuses for mixing, evaporating and reacting are required. Such mixers must have good mixing action and must also allow rapid renewal of their free surfaces where, for example, volatile components are evaporated.

Product deposits on the walls of such mixers, e.g. during polymerisation reactions, may have detrimental effects on the process concerned. Undesirable side reactions may for example be promoted in the deposits on account of the substantially prolonged residence time of the reaction mixture in the mixer. This leads to contamination of the product. Product deposits on the walls may be prevented by kinematic self-cleaning of the mixer.

In so doing, every effort should be made to obtain the largest possible free volume for the material to be mixed in order to minimise the apparatus costs.

In continuous high viscosity processes, axial conveyance of the material to be mixed through the reactor is also of great significance. The conveyance should take place within the prescribed reaction time. Frequently, a large number of equivalent agitation tanks are used in order to obtain a narrow molecular weight distribution during polymerisation reactions and to limit side reactions during other reactions. This requires low back-mixing within the mixing apparatus.

High axial permeability is also advantageous for the extraction of vapours during evaporation and condensation processes.

Extruders represent a good solution to the transport problem. When composed of two shafts, they also clean themselves in a completely kinematic manner. However, in known self-cleaning extruders, the usable volume (defined as the ratio of the volume of the housing minus the volume of the rotors compared with the volume of the housing) is frequently limited to below 50% and typically to less than 25%. Consequently, on account of the resulting high apparatus costs, only reactions with a residence time of less than three minutes are economically feasible.

The self-cleaning problem may be solved, whilst minimising the apparatus costs per volume, for example with the aid of multi-axis disc reactors. The basic design of such a reactor is described for example in reference FR-A-1 197 720.

European Published Application EP 0 460 466 A1 describes how the scrapers of a disc reactor can be designed for rotation in opposite or identical directions in order to obtain kinematic cleaning of the scrapers and extensive cleaning of the complete reactor.

U.S. Pat. No. 5 399 012 claims a reactor with shafts rotating in opposite directions that is fully kinematically self-cleaning.

European Patent Application EP 0 638 354 A1 describes a multi-axis mixer/reactor in which conveying blades that are connected by axially-extended kneading bars are attached to shafts rotating in opposite directions.

A common feature of the above references is that the problem of axial transport is given only little consideration.

In order to achieve axial transport, EP 0 460 466 A1 and U.S. Pat. No. 5,399,012 propose designing the scrapers on mixer discs in a spirally twisted form about the axis of rotation and thus imitating the conveying principle of an extruder. However, the spirally twisted design of the scrapers makes the production of such mixers considerably more expensive. For example, when the surfaces of the scrapers are milled, only linear treatment rather than flat treatment is possible or a 5-axis milling machine must be used rather than a 3-axis milling machine. Consequently the production costs for the rotors must be expected to be more than twice as high.

Another disadvantage of the mixer according to EP 0 460 466 A1 is that non-cleaned zones are present on the inner walls of the housing. In addition, such mixers provide no axial permeability for example for facilitating the removal of vapours since the discs of the mixer obstruct the gas flow.

This disadvantage is not displayed by the mixer according to U.S. Pat. No. 5,399,012. However, this mixer does additionally exhibit a high degree of back-mixing.

In EP 0 638 354, conveyance of the material to be mixed is intended to be achieved by conveying blades that are positioned obliquely to the axis of rotation. The conveying blades are however arranged in such a manner that they deflect the axial passage of the product and thus hinder their own conveying action.

The object of the invention was to find a mixer/reactor that enables the complete self-cleaning of the inner space of the mixer, but also has good axial permeability for example for the stream of vapours and exhibits good conveying activity.

According to the invention, this object is achieved by a mixer/reactor consisting of two or more parallel shafts rotating in opposite directions on which are located spirally arranged, axially offset paddles with scrapers on the front and rear sides of the paddles, and a surrounding housing with an inlet and an outlet and optionally a vapour opening, characterised in that all the scrapers on the upstream side of the paddles convey the material concerned outwards and all the scrapers on the downstream side of the paddles convey the material inwards and in that all the faces of the scrapers and paddles are fully kinematically cleaned.

Kinematic cleaning means the smallest possible reciprocal convergence between adjacent parts of the apparatus that is possible in view of the necessary free clearance between the parts that is required in order to prevent the shafts jamming.

The upstream side means the side whose surface points in the direction of the inlet. The downstream side points in the direction of the outlet. Outward conveyance by the scrapers means conveyance away from the shaft radially in the direction of the lateral wall of the housing. Inward conveyance designates the opposite direction towards the shaft.

In a preferred embodiment, all the geometrical edges of cut of the scrapers and paddles in any particular radial section are either epicycloids or circles about the center of rotation.

An epicycloid is the curve which a point $$\begin{pmatrix} x_1 \\ y_1 \end{pmatrix}$$

in the coordinate system of a rotor 1 whose centre is $$\begin{pmatrix} a \\ 0 \end{pmatrix}$$

describes in the coordinate system of the other rotor 2 whose centre is $$\begin{pmatrix} 0 \\ 0 \end{pmatrix} : \begin{pmatrix} x_1 \\ y_1 \end{pmatrix} = \begin{pmatrix} \cos(\omega_2 t) & \sin(\omega_2 t) \\ -\sin(\omega_2 t) & \cos(\omega_2 t) \end{pmatrix} *$$

$$\left[ \begin{pmatrix} \cos(\omega_1 t) & -\sin(\omega_1 t) \\ \sin(\omega_1 t) & \cos(\omega_1 t) \end{pmatrix} * \begin{pmatrix} x_1 \\ y_1 \end{pmatrix} + \begin{pmatrix} 0 \\ 0 \end{pmatrix} \right]$$

In the above equation, $\omega_1$ and $\omega_2$ are the angular velocities of the rotors and inverse signs designate a system rotating in the opposite direction.

In a further preferred embodiment, there is only one paddle on each rotor in each geometric radial section through the mixer.

In this embodiment, the outermost paddles in an axial direction are approximately half-discs (see FIG. 6). If discharge is to take place via the end face, these half-discs obstruct the flow of material. Easier discharge is possible in a further preferred embodiment by placing additional toothed discs on the half-discs.

In a further preferred embodiment, the end faces of the scrapers are connected to one another. In this way, the axial gas permeability is increased since, in the plane of the scraper end faces, the two scraper cross-sections no longer have a blocking effect but this blocking is reduced by the area of the connecting surface. The torsional load to which the paddles are exposed when a force acts on a scraper is reduced since a frame structure having a reinforcing effect is created by the shaft 2, the scrapers 4, 5 and the paddles 3 on each shaft.

The heating or cooling of the scrapers and paddles with a heat transfer fluid, e.g. via a system of heating lines inside the rotors is also facilitated. While it is otherwise necessary for both the inflow and back-flow of heat to be guided through the base of each paddle, in this design each heating line passes through the base of the first paddle of a sequence of paddles and scrapers connected to one another, and the remaining heating lines follow the same sequence. Finally, the back-flow is guided back to the shaft by the base of the last paddle in the sequence of paddles and scrapers connected to one another.

FIGURES

EXAMPLES

Figure 1:
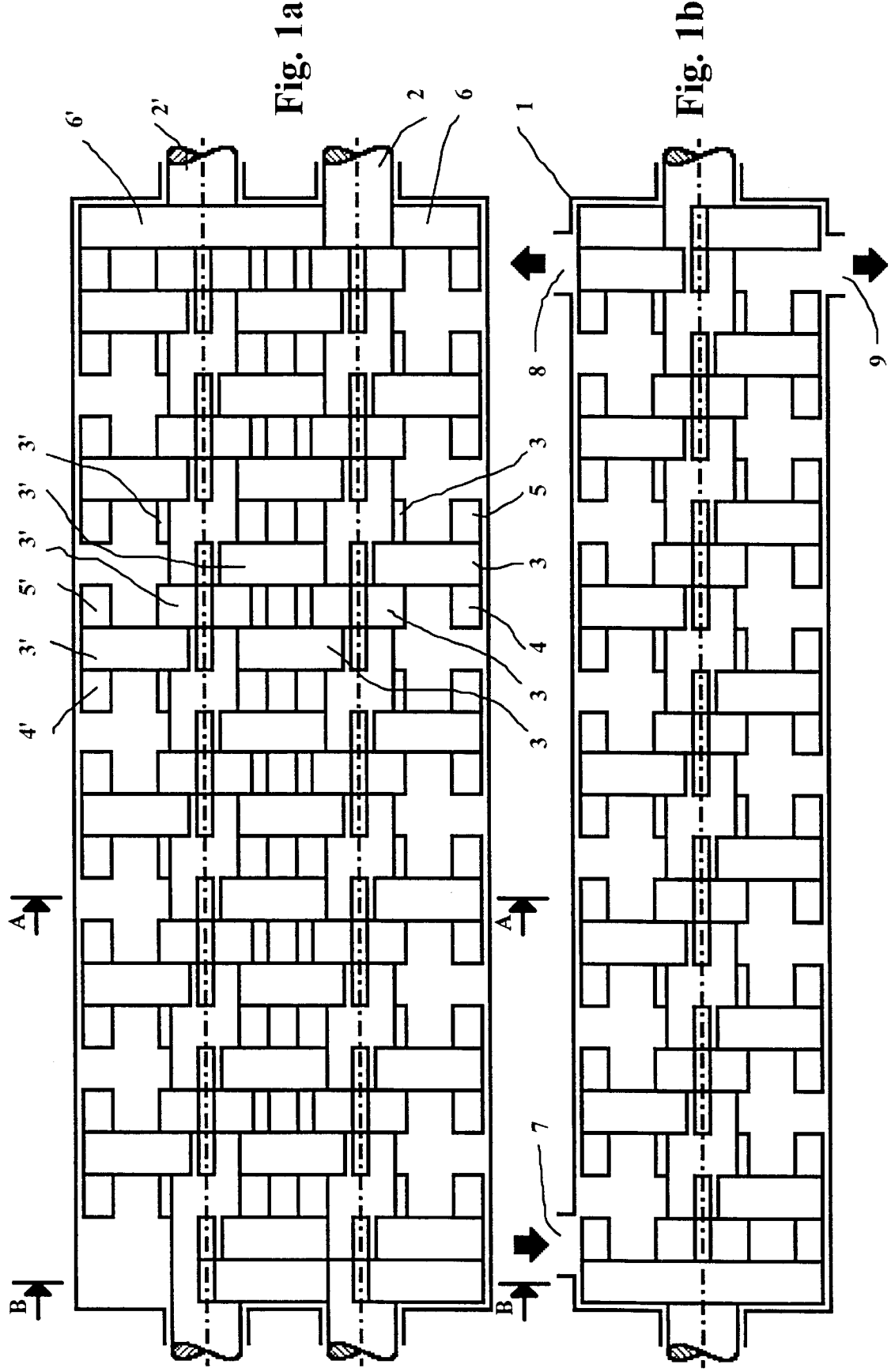
FIG. 1 shows the basic design of a mixer/reactor according to the invention.

FIG. 1 shows the basic design of a disc reactor according to the invention.

The radial sections of the mixer according to the invention are the decisive factor for understanding the kinematics. Accordingly, FIGS. 2, 3, 4, 5, 6 and 8 illustrate radial sections along the sections A—A and B—B from FIG. 1.

Example 1

Figure 2:
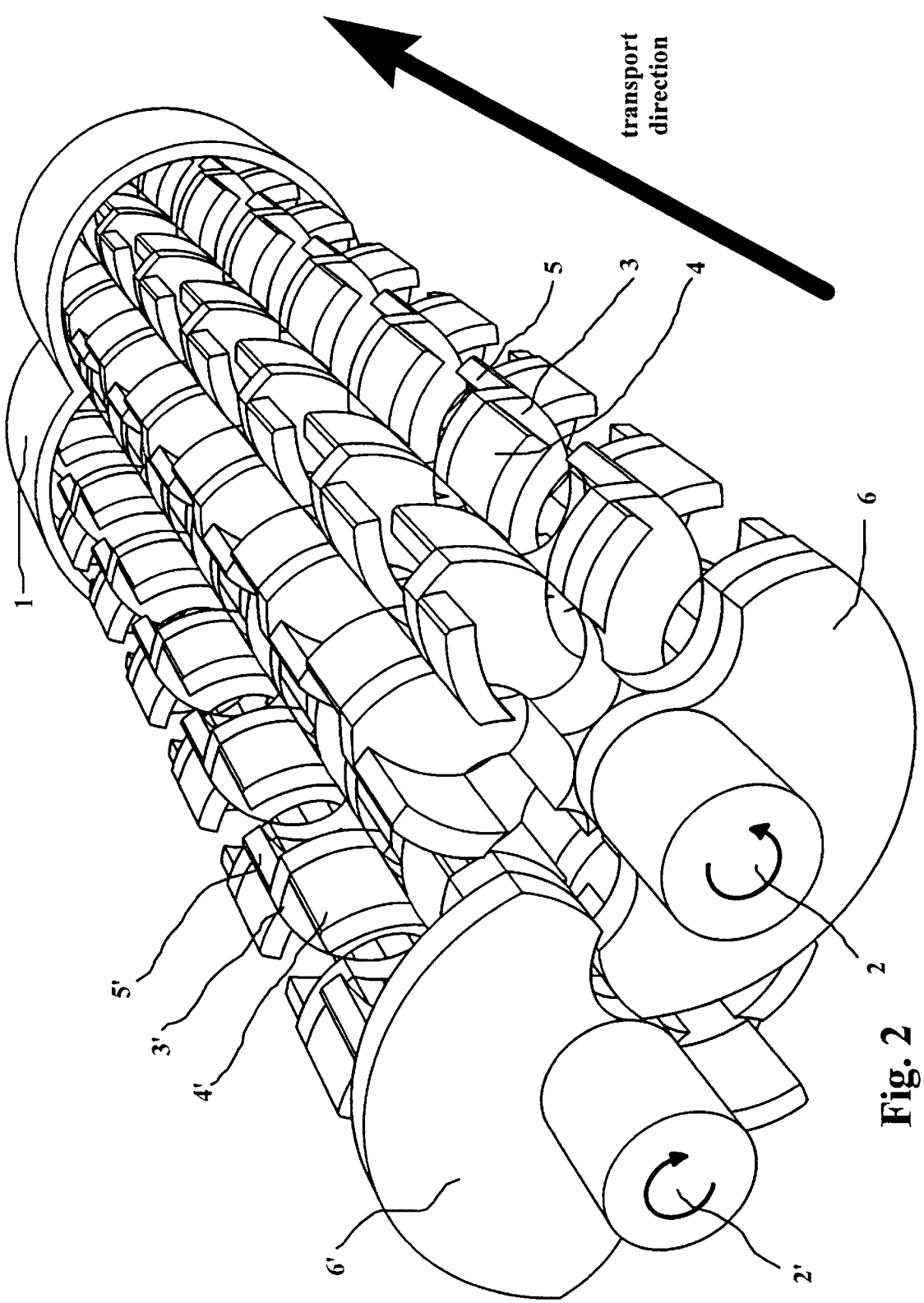
FIG. 2 shows, in perspective view, a reactor according to the invention. The housing is only partly illustrated for the sake of simplicity.

FIG. 2 shows a perspective view of shafts 2, 2', paddles 3, 3' and scrapers 4, 4', 5, 5' of a reactor/mixer according to the invention. The housing 1 is only partly shown for the sake of clarity. The shafts 2, 2' rotate at equal speeds in opposite directions. In each radial section, each shaft 2, 2' has a paddle 3, 3'. The outermost paddles 6, 6' are approximately half-discs. The other paddles 3, 3' are arranged spirally and axially offset on the shafts 2, 2'. They each have a scraper 4, 4', 5, 5' on the front and the rear. In the direction of rotation shown in the drawing, all the scrapers 4, 4' located upstream of the paddles convey the material concerned outwards and all scrapers 5, 5' located downstream of the paddles convey the mixing materials inwards. In this way, conveyance away from the viewer is obtained. In radial sections, all the edges of cut are either epicycloids, namely when the cleaning is carried out by an edge, or circles about the center of rotation, namely when the cleaning is carried out by a surface.

Figure 3:
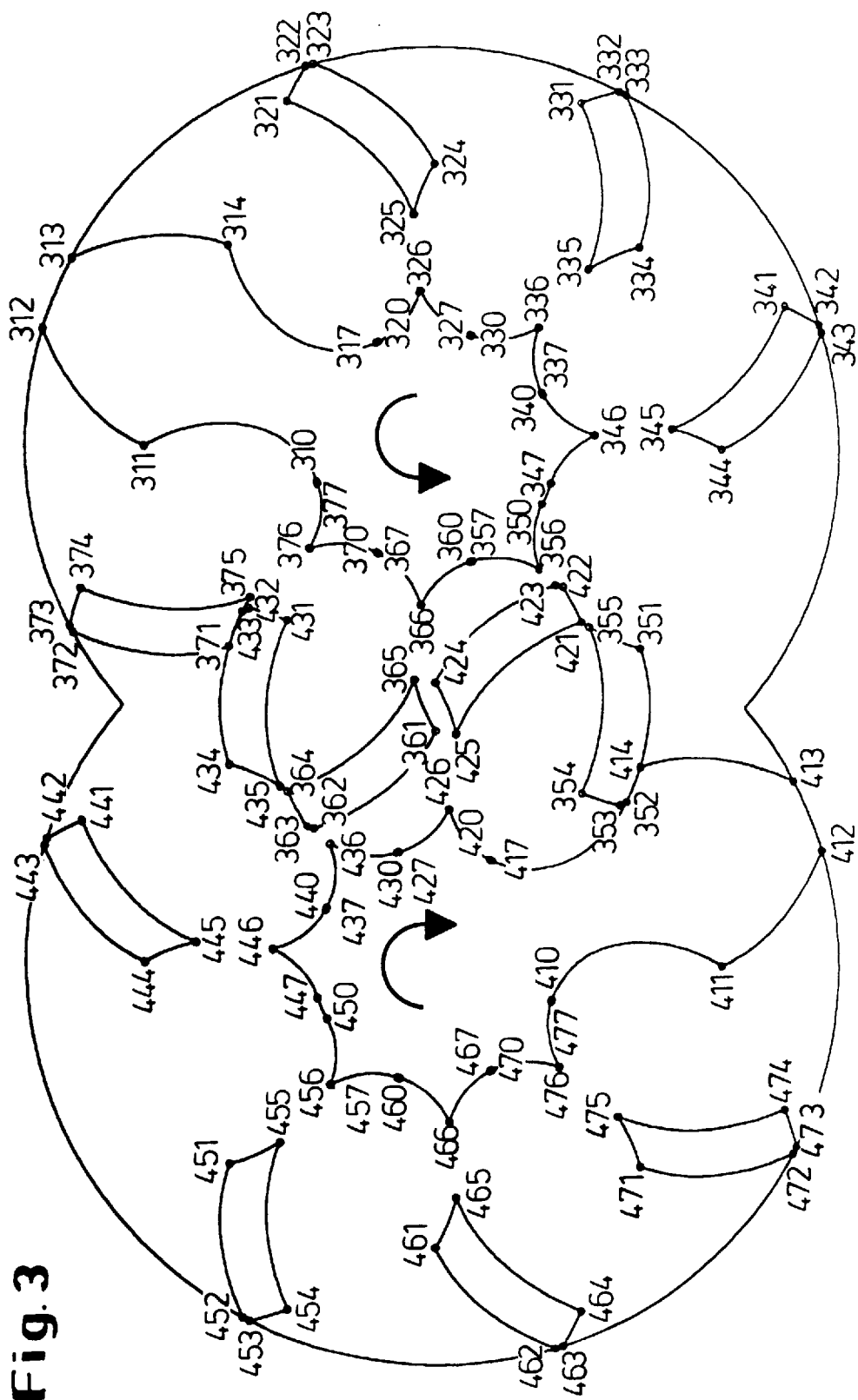
FIG. 3 shows a radial section along line A—A in FIG. 1 through the reactor according to FIG. 2.
Figure 7A:
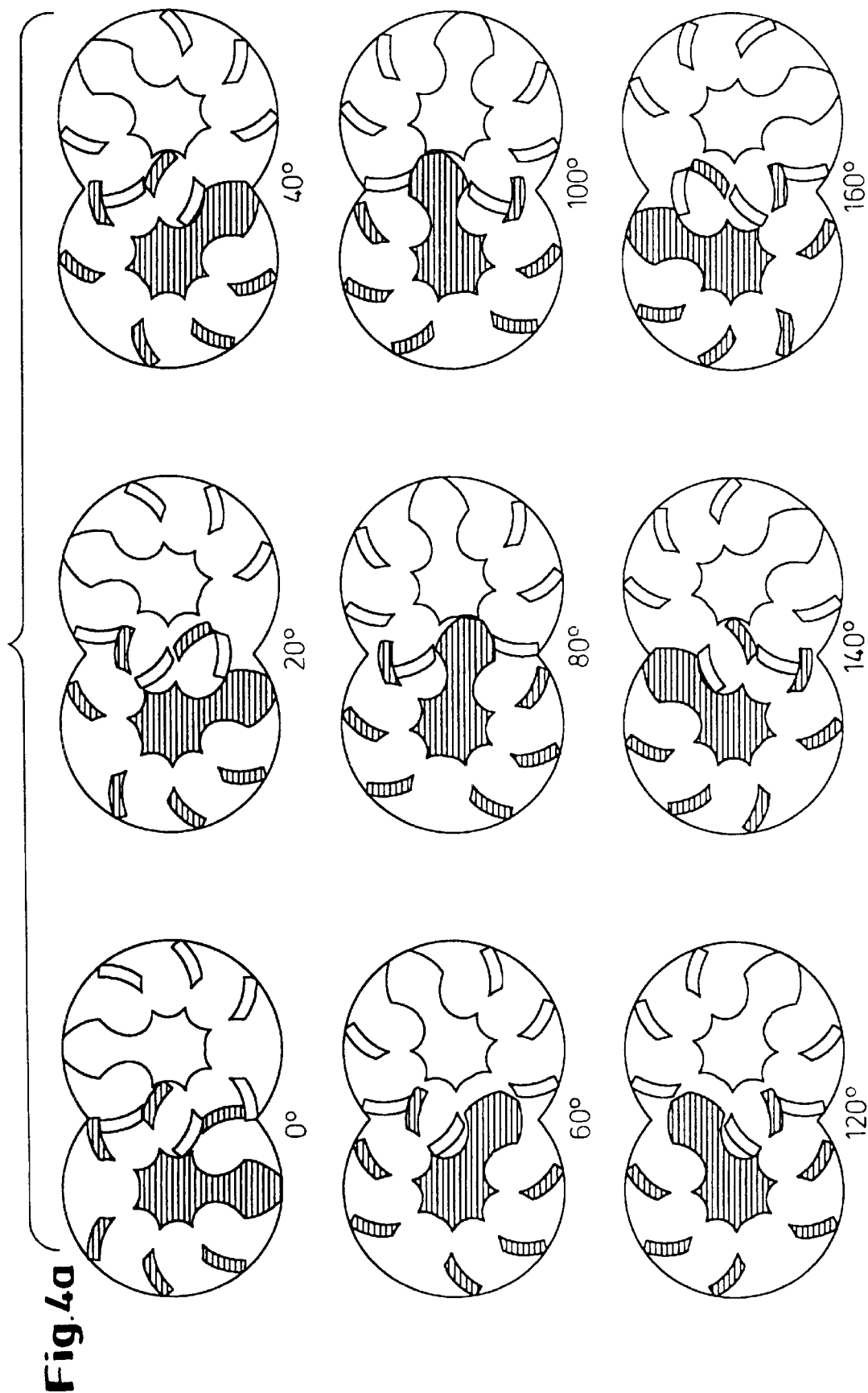
FIG. 7 shows, in a radial section along line B—B in FIG. 1 through the reactor according to FIG. 2 in which one rotor was held in place, the area covered by the other rotor.

FIG. 3 shows a radial section along line A—A in FIG. 1 through the reactor/mixer according to FIG. 2. The reciprocal cleaning is explained with reference to this drawing:

Surface 311-312 is cleaned by the edge 444,
Surface 312-313 is cleaned by the surface 447-450,
Surface 313-314 is cleaned by the edge 451,
Surface 314-317 is cleaned by the edge 452,
Surface 317-320 is cleaned by the surface 452-453, Surface 320-326 is cleaned by the edge 453,
Surface 325-321 is cleaned by the edge 453,
Surface 321-322 is cleaned by the edge 454,
Surface 322-323 is cleaned by the surface 457-460,
Surface 323-324 is cleaned by the edge 461,
Surface 324-325 is cleaned by the edge 462,
Surface 326-327 is cleaned by the edge 462,
Surface 327-330 is cleaned by the surface 462-463,
Surface 330-336 is cleaned by the edge 463,
Surface 335-331 is cleaned by the edge 463,
Surface 331-332 is cleaned by the edge 464,
Surface 332-333 is cleaned by the surface 467-470,
Surface 333-334 is cleaned by the edge 471,
Surface 334-335 is cleaned by the edge 472,
Surface 336-337 is cleaned by the edge 472,
Surface 337-340 is cleaned by the surface 472-471,
Surface 340-346 is cleaned by the edge 473,
Surface 345-341 is cleaned by the edge 473,
Surface 341-342 is cleaned by the edge 474,
Surface 342-343 is cleaned by the surface 477-410,
Surface 343-344 is cleaned by the edge 411,
Surface 344-345 is cleaned by the edge 412,
Surface 345-347 is cleaned by the edge 412,
Surface 347-350 is cleaned by the surface 412-413,
Surface 350-356 is cleaned by the edge 413,
Surface 355-351 is cleaned by the edge 413,
Surface 351-352 is cleaned by the edge 414,
Surface 352-353 is cleaned by the surface 417-420,
Surface 353-354 is cleaned by the edge 421,
Surface 354-355 is cleaned by the edge 422,
Surface 356-357 is cleaned by the edge 422,
Surface 357-360 is cleaned by the surface 422-423,
Surface 360-366 is cleaned by the edge 423,
Surface 365-361 is cleaned by the edge 423,
Surface 361-362 is cleaned by the edge 424,
Surface 362-363 is cleaned by the surface 427-430,
Surface 363-364 is cleaned by the edge 431,
Surface 364-365 is cleaned by the edge 432,
Surface 366-367 is cleaned by the edge 432,
Surface 367-370 is cleaned by the surface 432-433,
Surface 370-376 is cleaned by the edge 433,
Surface 375-371 is cleaned by the edge 433,
Surface 371-372 is cleaned by the edge 434,
Surface 372-373 is cleaned by the surface 437-440,
Surface 373-374 is cleaned by the edge 441,
Surface 374-375 is cleaned by the edge 442,
Surface 376-377 is cleaned by the edge 442,
Surface 377-310 is cleaned by the surface 442-443,
Surface 411-412 is cleaned by the edge 344,
Surface 412-413 is cleaned by the surface 347-350,
Surface 413-414 is cleaned by the edge 351,
Surface 414-417 is cleaned by the edge 352,
Surface 417-420 is cleaned by the surface 352-353,
Surface 420-426 is cleaned by the edge 353,
Surface 425-421 is cleaned by the edge 353,
Surface 421-422 is cleaned by the edge 354,
Surface 422-423 is cleaned by the surface 357-360,
Surface 423-424 is cleaned by the edge 361,
Surface 424-425 is cleaned by the edge 362,
Surface 426-427 is cleaned by the edge 362,
Surface 427-430 is cleaned by the surface 362-363,
Surface 430-436 is cleaned by the edge 363,
Surface 435-431 is cleaned by the edge 363,
Surface 431-432 is cleaned by the edge 364,
Surface 432-433 is cleaned by the surface 367-370,
Surface 433-434 is cleaned by the edge 371,
Surface 434-435 is cleaned by the edge 372,
Surface 436-437 is cleaned by the edge 372,
Surface 437-440 is cleaned by the surface 372-371,
Surface 440-446 is cleaned by the edge 373,
Surface 445-441 is cleaned by the edge 373,
Surface 441-442 is cleaned by the edge 374,
Surface 442-443 is cleaned by the surface 377-310,
Surface 443-444 is cleaned by the edge 311,
Surface 444-445 is cleaned by the edge 312,
Surface 445-447 is cleaned by the edge 312,
Surface 447-450 is cleaned by the surface 312-313,
Surface 450-456 is cleaned by the edge 313,
Surface 455-451 is cleaned by the edge 313,
Surface 451-452 is cleaned by the edge 314,
Surface 452-453 is cleaned by the surface 317-320,
Surface 453-454 is cleaned by the edge 321,
Surface 454-455 is cleaned by the edge 322,
Surface 456-457 is cleaned by the edge 322,
Surface 457-460 is cleaned by the surface 322-323,
Surface 460-466 is cleaned by the edge 323,
Surface 465-461 is cleaned by the edge 323,
Surface 461-462 is cleaned by the edge 324,
Surface 462-463 is cleaned by the surface 327-330,
Surface 463-464 is cleaned by the edge 331,
Surface 464-465 is cleaned by the edge 332,
Surface 466-467 is cleaned by the edge 332,
Surface 467-470 is cleaned by the surface 332-333,
Surface 470-476 is cleaned by the edge 333,
Surface 475-471 is cleaned by the edge 333,
Surface 471-472 is cleaned by the edge 334,
Surface 472-473 is cleaned by the surface 337-340,
Surface 473-474 is cleaned by the edge 341,
Surface 474-475 is cleaned by the edge 342,
Surface 476-477 is cleaned by the edge 342,
Surface 477-410 is cleaned by the surface 342-343.

Figure 4B:
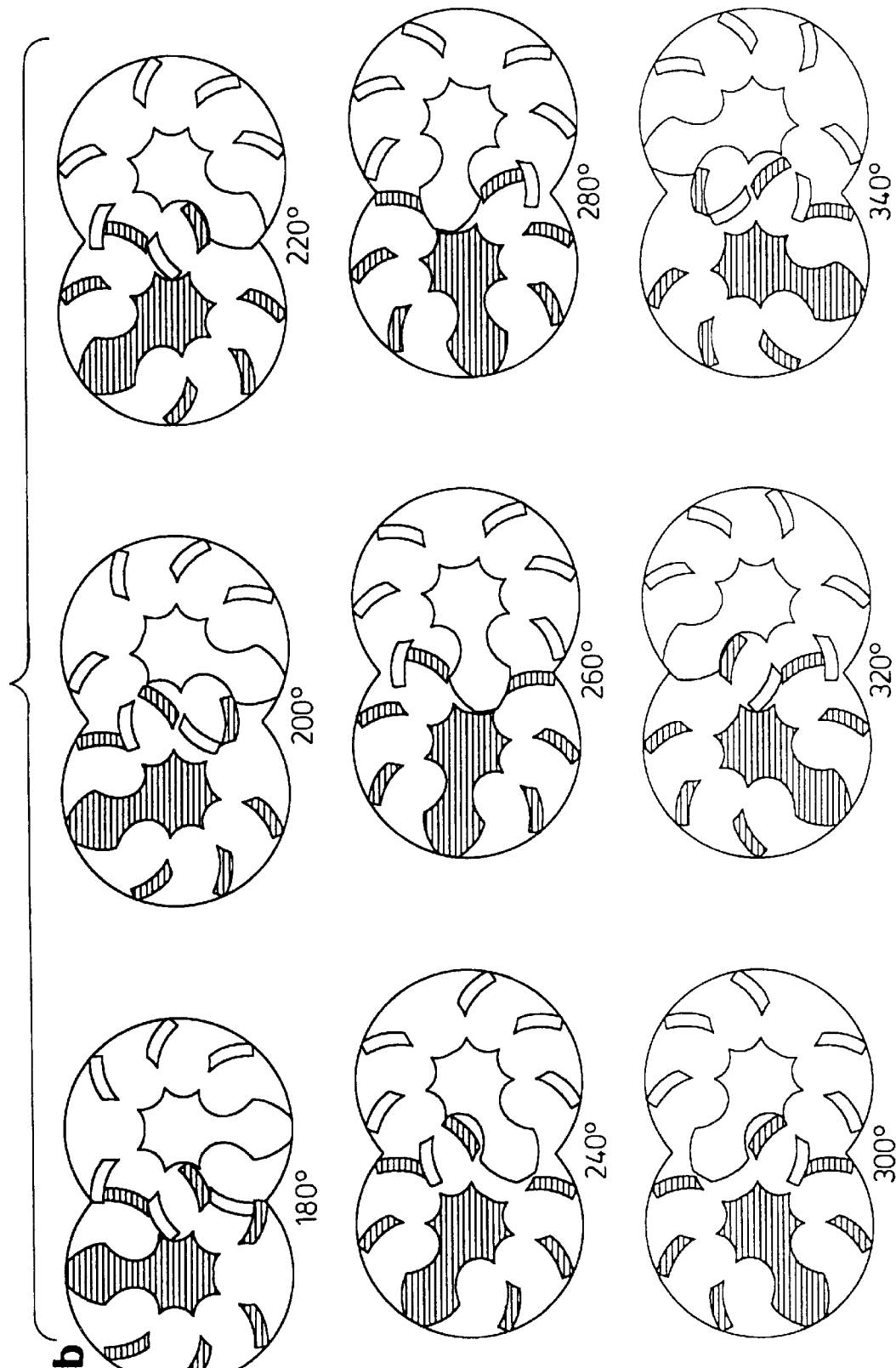
FIG. 4 shows a succession of drawings of a radial section along line A—A in FIG. 1 through the reactor according to FIG. 2 at various angles of rotation.

The reciprocal movement of the rotors is clearly shown in FIGS. 4a and 4b, which show the same radial section as in FIG. 3, but separately at successive intervals, starting with 0°, the angle of rotation between each diagram being 20°.

Figure 5:
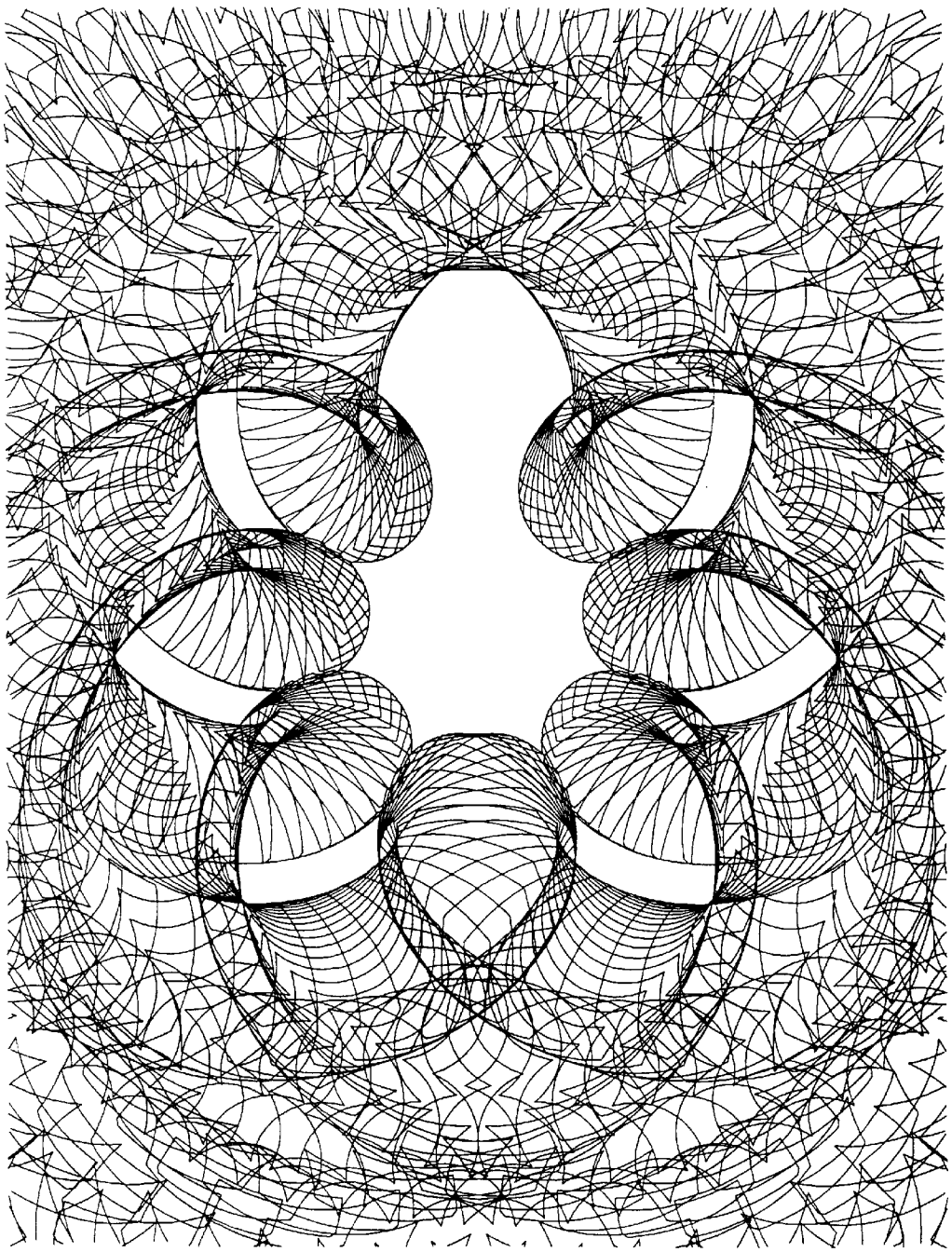
FIG. 5 shows, in a radial section along line A—A in FIG. 1 through the reactor according to FIG. 2 in which one rotor was held in place, the area covered by the other rotor.

The all-over cleaning is clearly shown in FIG. 5. This shows the same radial section as in FIGS. 3 and 4. However, one rotor is shown at rest as a reference system and the various phase positions of the other rotor are then printed in an overlapping manner relative to the rotor. It can be seen that all the edges of cut shown in the radial section are cleaned. Since, in addition, apart from the cross-section covered by the "resting" rotor itself, the entire cross-section within the diameter of the housing is passed through, it is clear that the end faces of the subsequent paddles and scrapers are also fully cleaned.

Figure 6:
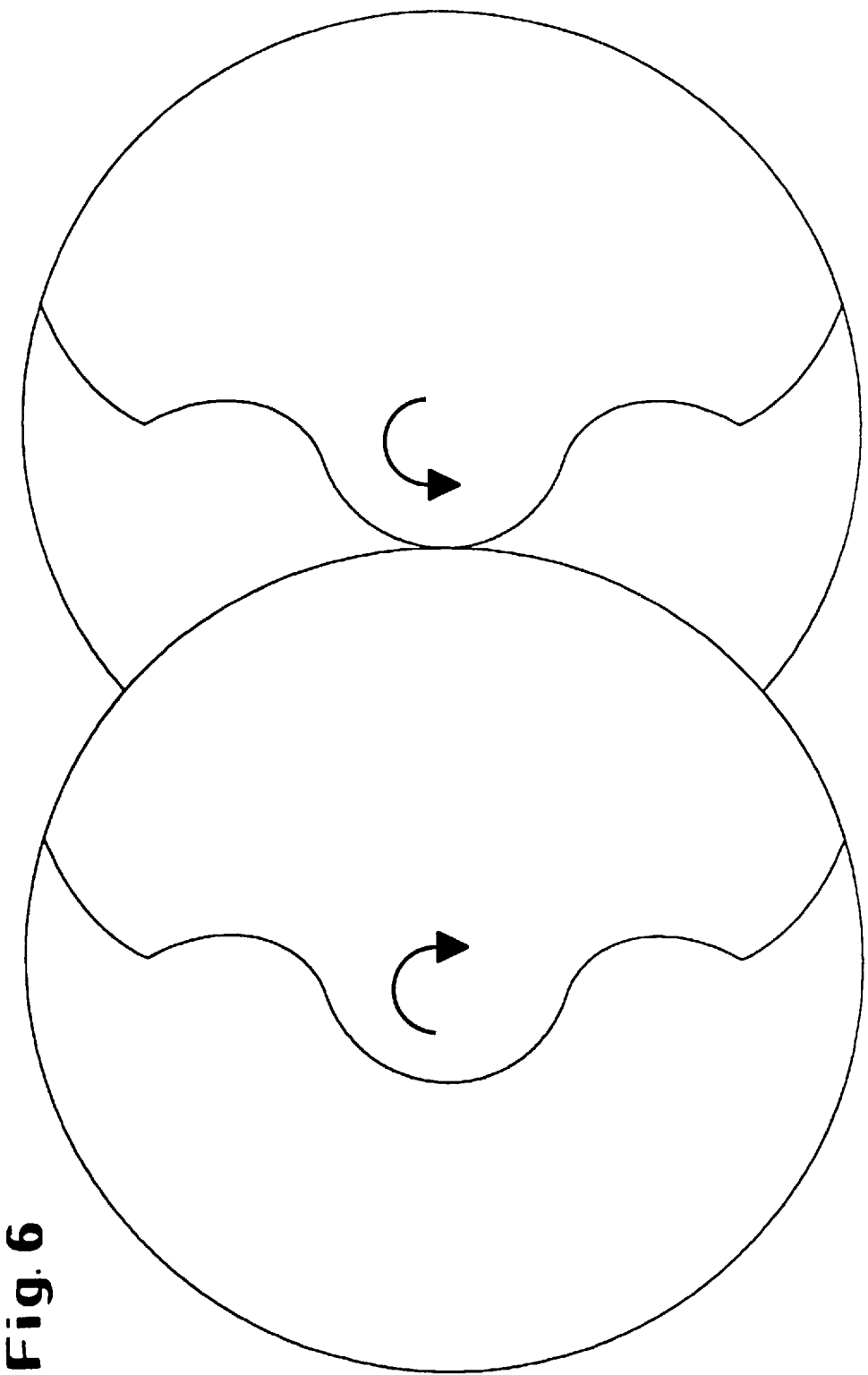
FIG. 6 shows, in a radial section along line B—B in FIG. 1 through the reactor according to FIG. 2, the outermost paddles.
Figure 7:
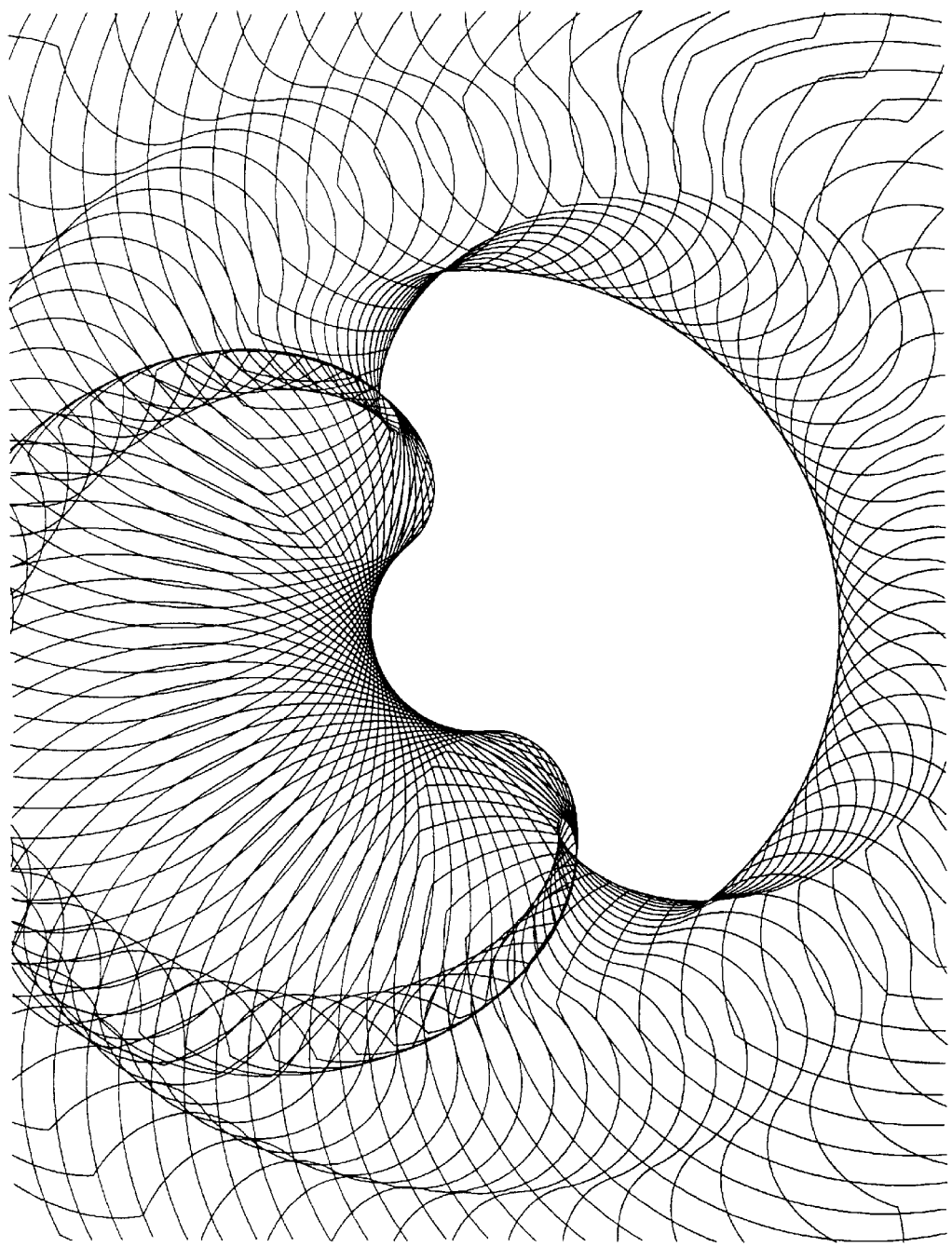

FIG. 6 shows a radial section along line B—B in FIG. 1 through the outermost paddles of the mixer/reactor according to FIG. 2. In FIG. 7, one rotor is again illustrated "at rest" together with the relative movement of the other rotor. The various phase positions of the other rotor are then printed in an overlapping manner relative to the "resting" rotor. Here, as well, the all-over cleaning can be clearly seen.

Figure 12:
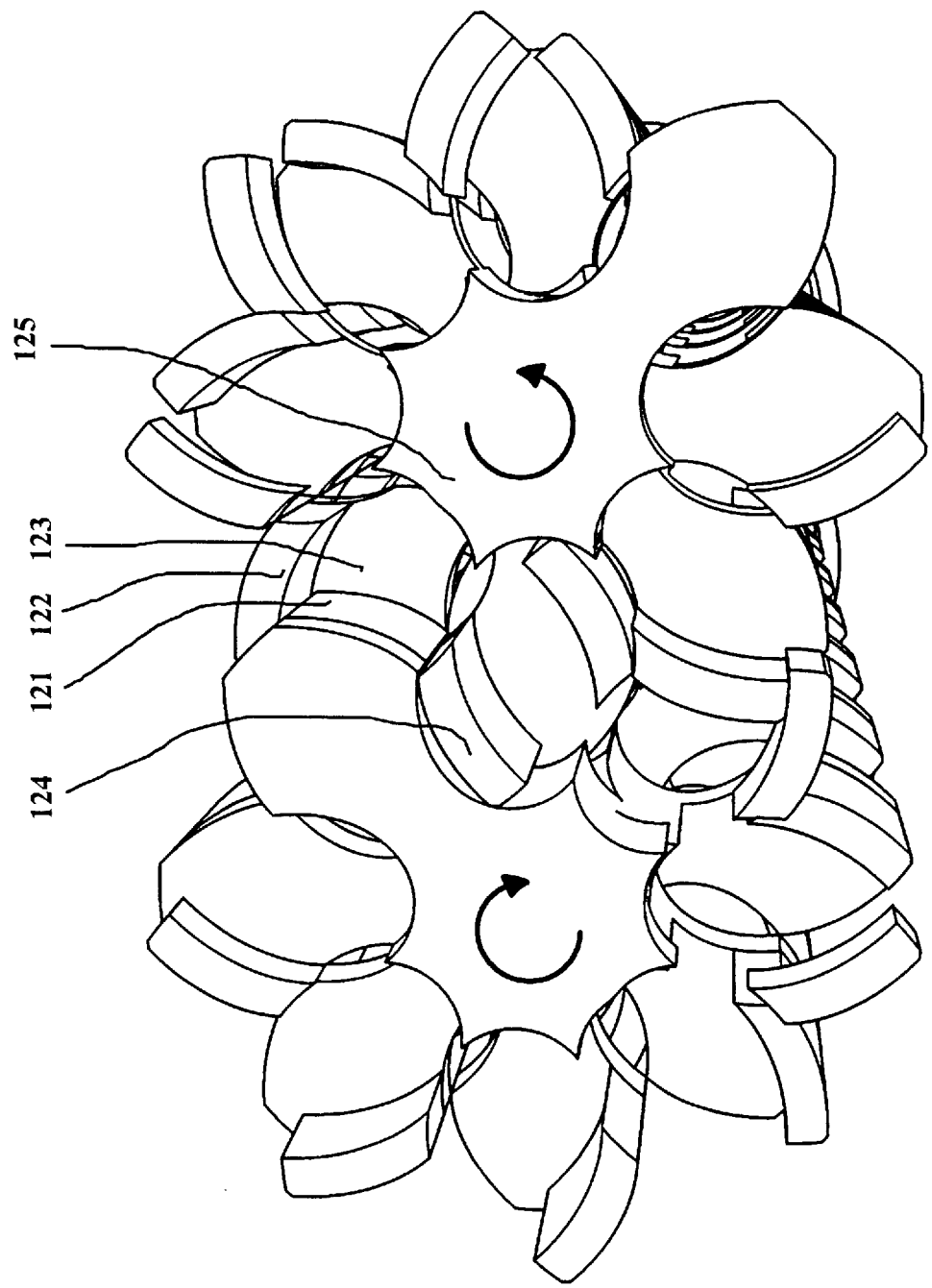
FIG. 12 shows the mixer from FIG. 2 in another view. However, the outermost half-disc-shaped paddles are not illustrated.

FIG. 12 shows the same mixer as in FIG. 2 from another perspective. However, the outermost paddles in FIG. 12 are not illustrated. In this figure, the axial conveying effect can be explained in a simplified manner. The scrapers 122 and 124, together with the paddle 123 and the shaft 125, form a chamber into which the paddle 121 moves during the rotation of the shafts. In so doing, the product contained therein is pressed out of the chamber. It can only escape axially towards the viewer or through the gaps between the paddles 122 and 124 and the shaft. Emergence in an axial direction away from the viewer is not possible since this side is closed by the paddle 123. Overall, the result is a movement of the product in which the scrapers 121 conveying the material concerned outwards are located upstream of the paddles and the scrapers conveying the material inwards are located downstream of the paddles.

EXAMPLE 2

Figure 8:
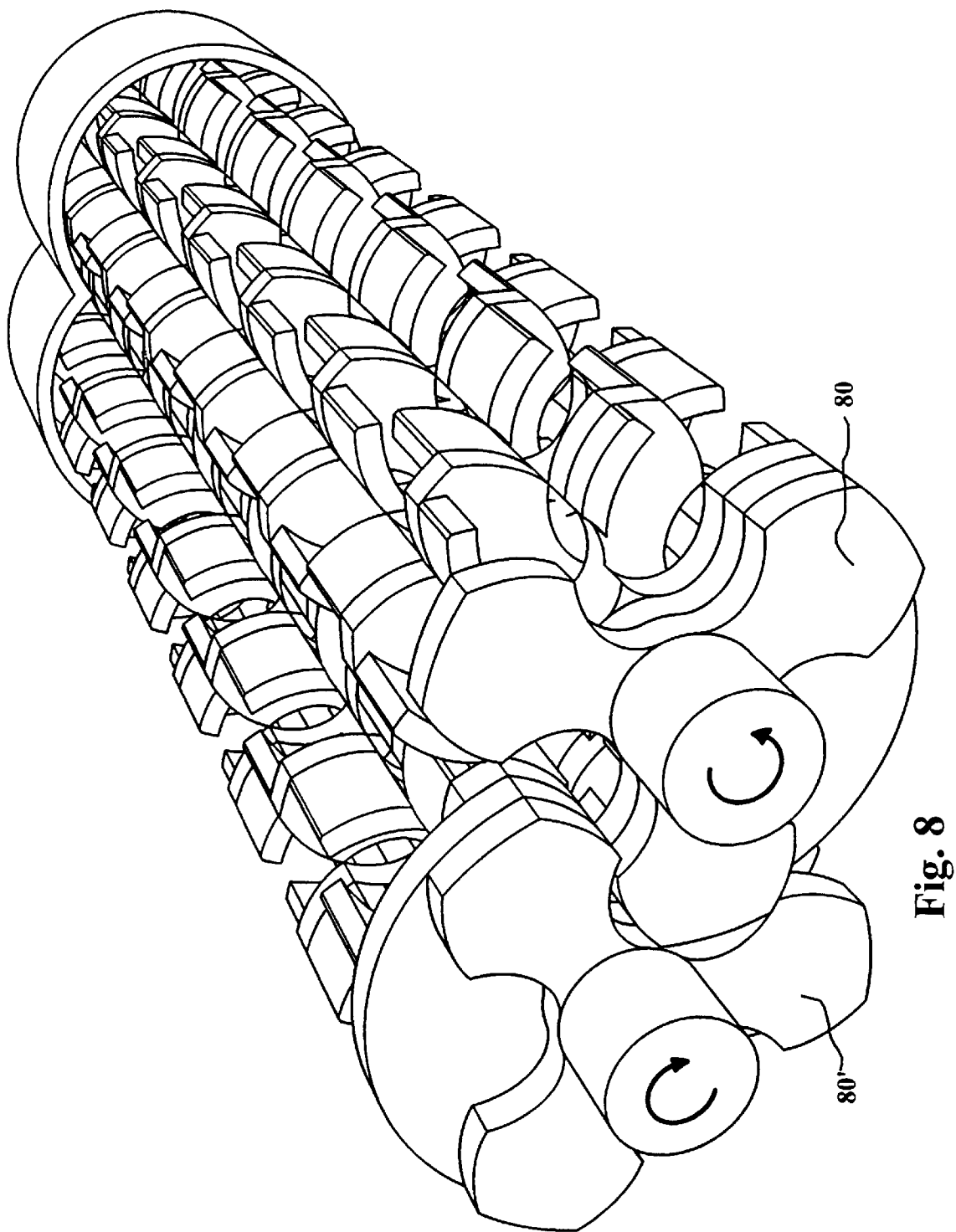
FIG. 8 shows a reactor according to the invention in which a pair of toothed discs was attached to the axial end in order to assist conveyance at the outlet.
Figure 9:
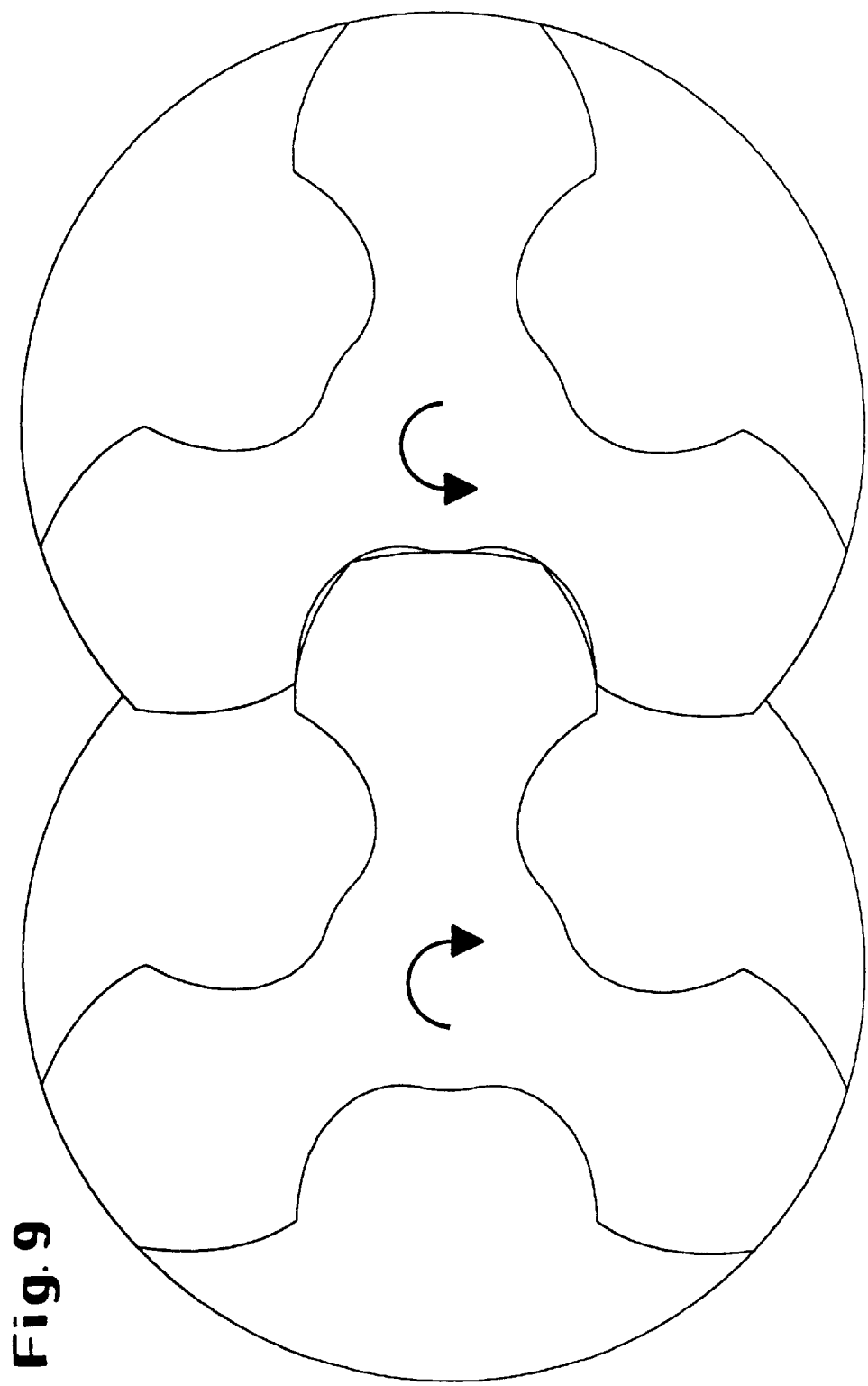
FIG. 9 shows, in a radial section, the outermost pair of toothed wheels of the reactor according to FIG. 8.
Figure 10:
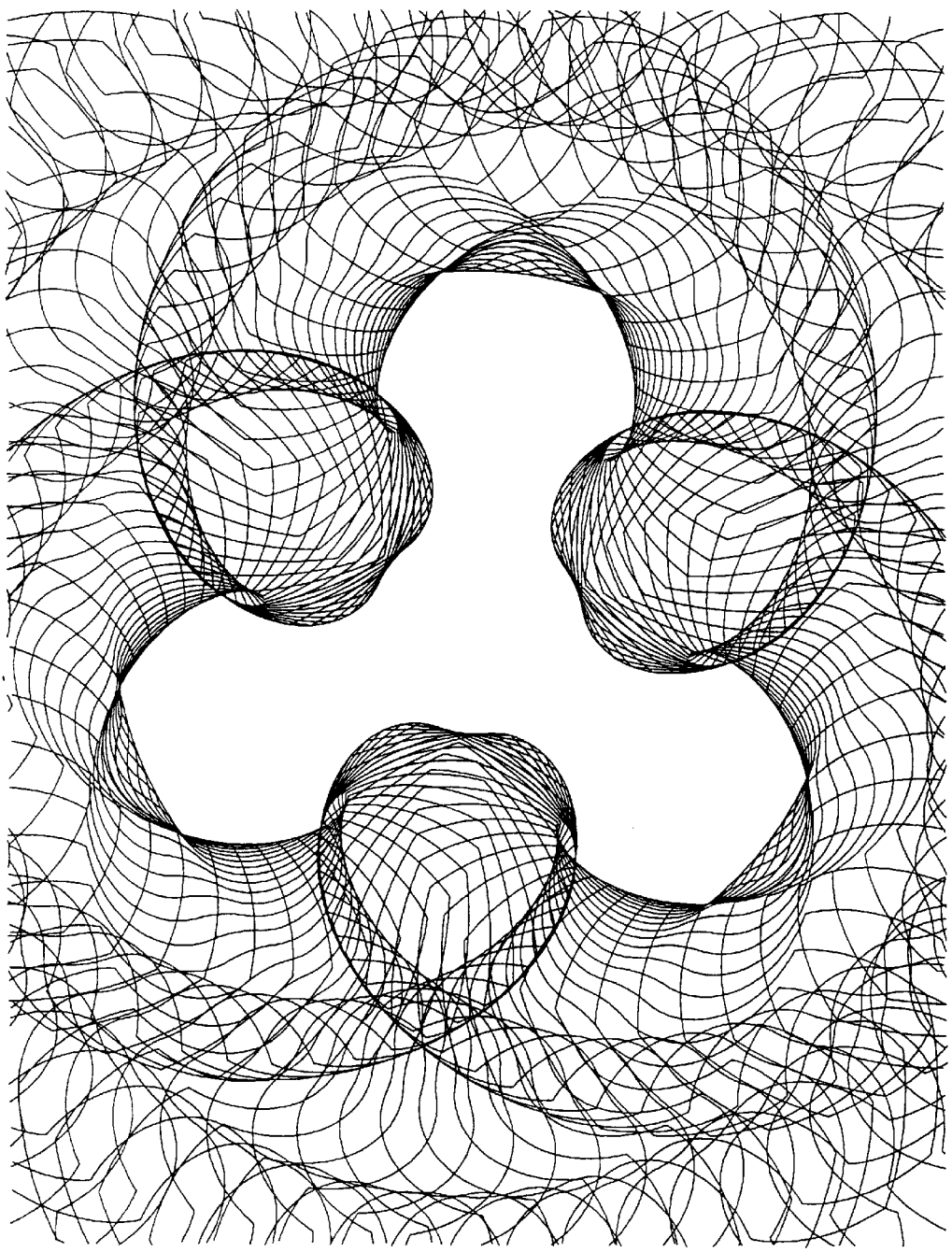
FIG. 10 shows, in a radial section through the outermost pair of toothed wheels of the reactor according to FIG. 8 in which one toothed wheel was held in place, the area covered by the other toothed wheel.

FIG. 8 shows a further preferred embodiment of the mixer according to the invention. The geometry is identical to example 1, apart from the toothed discs 80, 80' added to the axial ends of the shafts. The self-cleaning of such toothed discs is described in U.S. Pat. No. 5 399 012. FIG. 9 shows a radial section through the outermost toothed wheels 80, 80'. FIG. 10 shows a radial section through the toothed wheels in which one toothed wheel is represented as relatively at rest and in which the various phase positions of the engaged toothed wheel of the other shaft are printed over one another. The all-over cleaning can be clearly seen.

EXAMPLE 3

Figure 11:
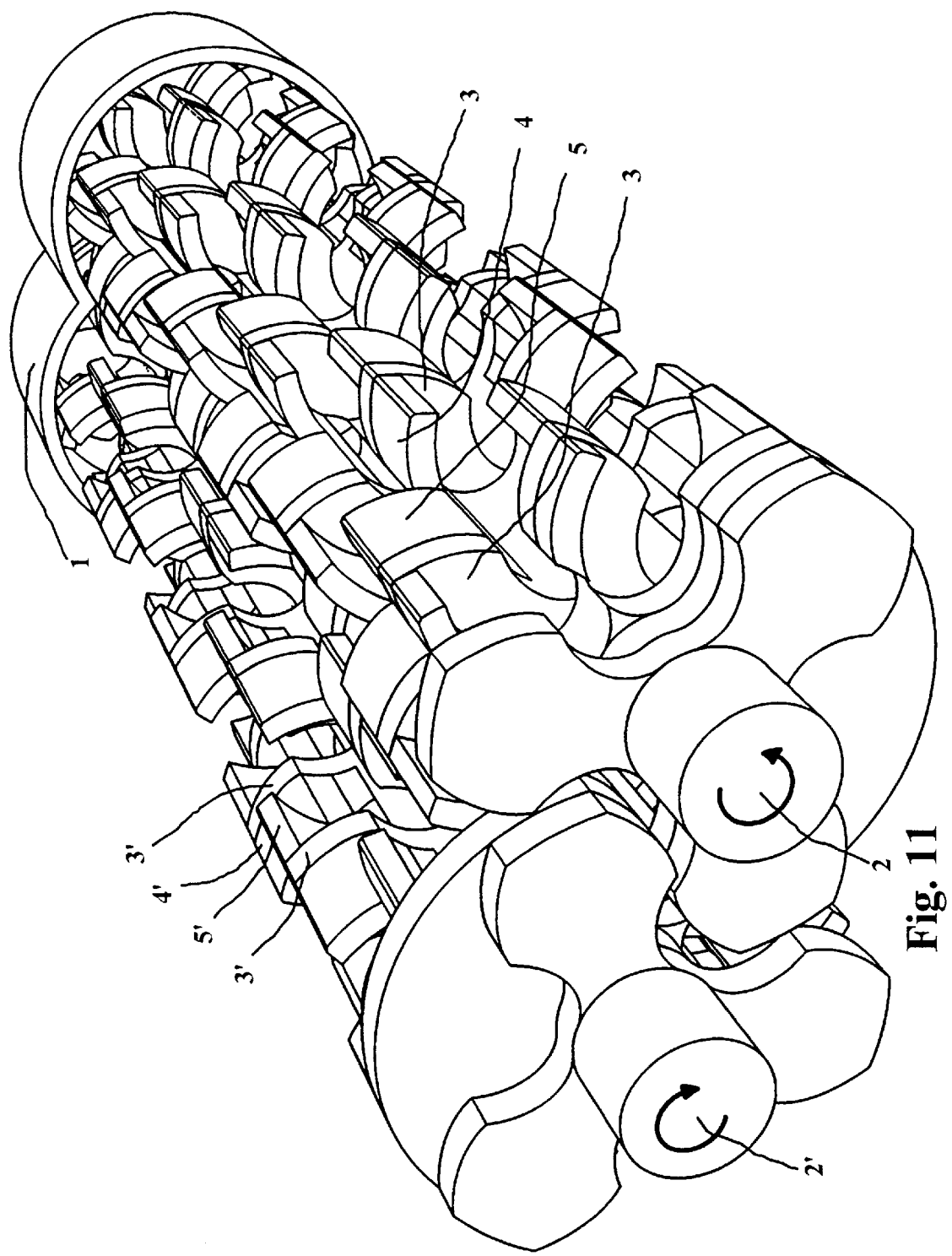
FIG. 11 shows, in a perspective view, a further preferred embodiment of the mixer/reactor according to the invention, in which scrapers conveying the material concerned inwards and outwards are connected to one another at their end faces. The housing 1 is only partly shown for the sake of clarity.
Figure 13:
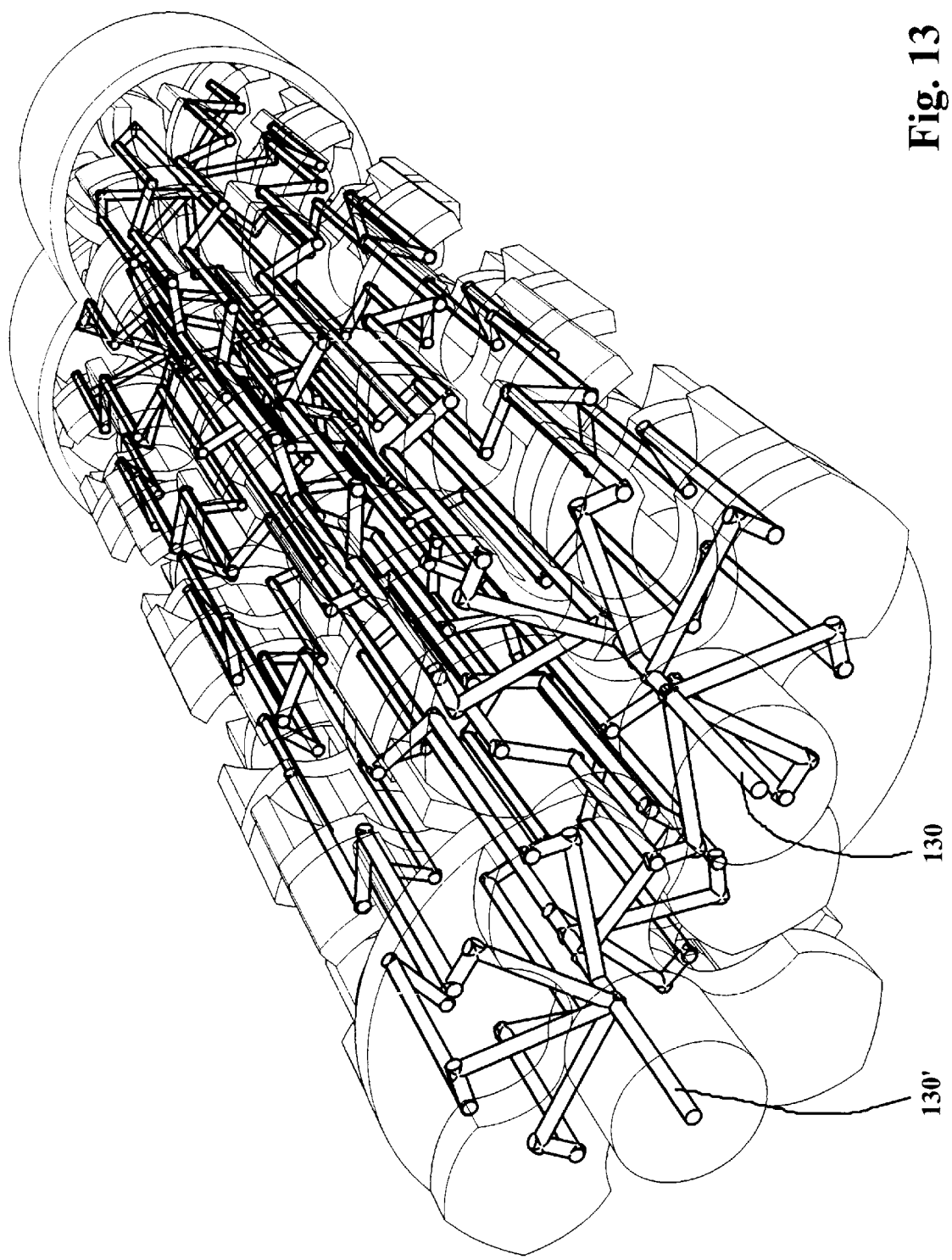
FIG. 13 shows, in perspective view, a possible system of heating pipes for fluid heating of the mixer/reactor in FIG. 11.

FIG. 11 shows a further preferred embodiment. It differs from example 2 in that the inward-conveying scrapers 5, 5' and the outward-conveying scrapers 4, 4' are connected to one another at their end faces. In this way, the axial gas permeability is increased since, in the plane of the end faces of the scrapers, the two scraper cross-sections no longer have a blocking effect, but rather this blocking is reduced by the area of the connecting surface. The torsional load to which the paddles are exposed when a force acts on a scraper is reduced since a frame structure having a reinforcing effect is created from the shaft 2, the scrapers 4, 5 and the paddles 3 of each shaft. The heating or cooling of the scrapers and paddles with a heat transfer medium, e.g. via a system of heating pipes 130, 130' inside the rotors, is also facilitated. Whereas, in the rotors in examples 1 and 2, both the heating inflow and back-flow have to pass through the base of each paddle, here it is sufficient to allow the heating pipes to follow the sequence of paddles and scrapers connected to one another. An expedient arrangement of heating pipes in the installed components of a mixer according to the invention is illustrated in FIG. 13.

We claim:

1. A mixer consisting of at least two parallel shafts rotating in opposite directions on which are located in a spiral arrangement, axially offset paddles with scrapers on upstream and downstream sides of the paddles, and a surrounding housing with an inlet and an outlet wherein all the scrapers on the upstream side of the paddles convey process material outwards and all the scrapers on the downstream side of the paddles convey the process material inwards, and wherein all of the scrapers and paddles have faces which are fully kinematically cleaned.

2. A mixer according to claim 1, wherein the scrapers and paddles include sections of epicyloid edges of cut in any geometrical radial section through the mixer.

3. A mixer according to claim 2, characterised in that in each geometrical radial section only one paddle is located on each shaft.

4. A mixer according to claim 3, wherein each shaft includes toothed discs that clean each other's circumferences arranged on at least one end of each shaft next to the last paddle, in the axial direction.

5. A mixer according to claim 1, characterised in that inward conveying scrapers and outward conveying scrapers are connected to one another.

6. A mixer according to claim 1, wherein the scrapers and paddles include edges of cut in the form of arcs of circles generated about centers of rotation of the shafts.

7. A mixer according to claim 6, characterised in that in each geometrical radial section only one paddle is located on each shaft.

8. A mixer according to claim 1, wherein the surrounding housing includes a vapor opening.

* * * * *

UNITED STATES PATENT AND TRADEMARK OFFICE
CERTIFICATE OF CORRECTION

PATENT NO. : 5,876,115
DATED : March 2, 1999
INVENTOR(S) : Klaus Schebesta et al.

It is certified that error appears in the above-identified patent and that said Letters Patent is hereby corrected as shown below:

Column 3, line 19(in the formula), "o" should read --a--.

Signed and Sealed this

Twenty-ninth Day of June, 1999

Attest:

Q. TODD DICKINSON

*Attesting Officer*     Acting Commissioner of Patents and Trademarks